United States Patent [19]

Heidecker

[11] 4,358,035

[45] Nov. 9, 1982

[54] SYSTEMS FOR HOLDING SMALL ARTICLES IN A LOAD COMPARTMENT

[76] Inventor: Hanns Heidecker, Ohlenkamp 28, D-2000 Hamburg 52, Fed. Rep. of Germany

[21] Appl. No.: 225,448

[22] Filed: Jan. 15, 1981

Related U.S. Application Data

[63] Continuation of Ser. No. 54,175, Jul. 2, 1979, abandoned.

[51] Int. Cl.³ .............................................. B60R 9/06
[52] U.S. Cl. .............................. 224/42.42; 220/22.1; 220/22.3; 414/522
[58] Field of Search ............... 224/42.42 R; 220/19, 220/22, 22.1, 22.3; 211/85, 132, 181, 195; 414/522

[56] References Cited

U.S. PATENT DOCUMENTS

| | | | |
|---|---|---|---|
| 2,883,764 | 4/1959 | Stephens | 434/72 |
| 2,896,271 | 7/1959 | Kloote et al. | 52/63 |
| 2,964,210 | 12/1960 | Paley | 220/21 X |
| 3,353,704 | 11/1967 | Belcher et al. | 220/22 |
| 3,498,655 | 3/1970 | Arms et al. | 217/65 X |
| 3,501,019 | 3/1970 | Armstrong et al. | 220/19 X |
| 3,920,144 | 11/1975 | Callen | 220/22 |
| 4,189,056 | 2/1980 | Majewski | 220/19 X |
| 4,303,367 | 12/1981 | Bott | 220/22 X |

*Primary Examiner*—Steven M. Pollard
*Attorney, Agent, or Firm*—Sherman & Shalloway

[57] ABSTRACT

A system for holding small articles in a luggage boot consists of a base plate, board or panel and wall elements. The base panel has recesses into which the edges of the wall elements are fitted from above and in which they are held in relation to the bearing forces exerted on them by the articles.

The base panel may be assembled from a plurality of base elements to the size required. A plurality of wall elements can be interconnected. Additional means are provided to secure the wall elements on the base panel.

8 Claims, 5 Drawing Figures

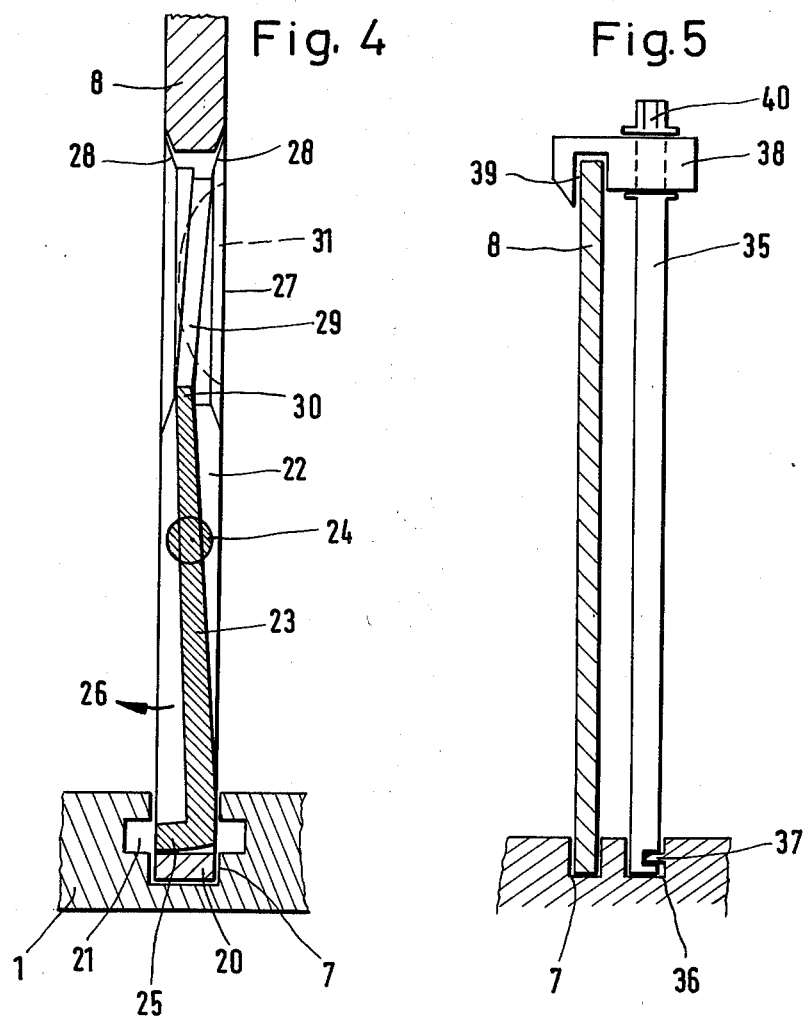

SYSTEMS FOR HOLDING SMALL ARTICLES IN A LOAD COMPARTMENT

This is a continuation of application Ser. No. 054,175, filed July 2, 1979, now abandoned.

This invention relates to a system for holding small articles in a load compartment, more particularly in the luggage boot of a motor vehicle, comprising at least one wall element and a retaining member extending transversely thereof and bearing on the base of the load compartment.

Small articles carried in a luggage boot frequently change position undesirably due to the acceleration occurring during braking, travelling around bends, and during acceleration itself. Articles which are sensitive to impacts may be damaged as a result while articles which are required to be transported in a specific position (e.g. upon containers, such as bottles or shopping bags) tip over and empty their contents. Belts provided in the luggage boot to secure the articles have the disadvantage that they do not securely hold articles in a specific position, because of the belt flexibility, and also they are complicated to handle.

A system of the kind referred to above is already known (DOS 20 18 094), which consists of a plurality of wall elements disposed crosswise in the luggage boot, said elements having incisions at the points of intersection, to receive the other intersecting wall element. The disadvantage of these incisions is that they impair the stability of the wall elements. They can therefore be provided only in a small number therein, so that only a limited number of boot division possibilities exists. The wall elements are sufficiently stabilized in respect of one another in the luggage boot only if there are at least two parallel wall elements in each direction, so that the luggage boot is divided up into at least nine compartments. However, it is often not desired to divide the luggage boot as much as this, e.g. if large articles have to be transported in addition to just one small article or just a few small articles. Another disadvantage of the known luggage boot divider is that the division is not easy to change, because the insertion of the wall elements at a plurality of wall intersection points is very complicated. Finally, the known system has the disadvantage that the wall elements are held securely in the luggage boot only if their length corresponds exactly to the inside dimensions of the particular luggage boot. The bearing forces transmitted by the articles to the wall elements have to be transmitted from the latter to the side walls of the luggage boot. The wall elements must therefore have an individual length for each type of vehicle and cannot be varied inside the luggage boot, because they have a length corresponding to the distance between the luggage boot walls only at a quite specific location in the luggage boot.

The object of the invention, therefore, is to provide a system of the kind referred to hereinbefore whereby the load compartment division can be easily changed and which can also be used for different boot dimensions.

To this end, according to the invention, the retaining means provided is a base plate, panel or board which is adapted to be laid on the floor of the luggage compartment and which is formed with a plurality of recesses into which the edge of the wall element or elements can be fitted.

The possible positions of the wall elements are limited only by the number and position of the recesses in the base panel, and these recesses may be provided in large numbers and in different directions. It is therefore possible to fix articles of any desired size at any place and in any direction without interfering with the rest of the luggage compartment. The base panel may be fitted in the luggage boot either at the manufacturing stage, or else it may be fitted subsequently. The wall elements are generally inserted as required in each individual case. If large articles are to be carried, the wall elements can be removed without the base panel having to be removed.

The use of a base plate or the like for securing articles in a load area is known per se (DAS 24 43 882), in which it is provided with a number of upright projections engaging after the style of studs in the baseplates of locking means which co-operate with the articles requiring to be fixed. The dimensions of the baseplate are of the same order as the height of the locking devices. The latter cannot therefore act as walls for small articles. On the contrary, they are generally so fitted, in order accurately to match a specific article, e.g. a crate, as to co-operate with the corners thereof. The disadvantage of connecting the locking devices to the associated baseplates is that they must be fixed on the baseplate before the article is introduced, because the latter engages over the baseplates. This is necessary to ensure that the weight of the article holds the baseplate on the base panel when lateral bearing forces act on the upright locking element connected to the baseplate. In contradistinction thereto, the wall elements in the invention can be fitted in any desired positions even after an article has been loaded. This is a great advantage because otherwise the dimensions of the load would have to be accurately measured beforehand in order to find the correct position of the locking elements, and because it is often difficult to place a heavy article on an accurately determined place in the luggage compartment, such place being defined by the locking elements.

The invention enables the article to be loaded in the boot irrespective of its exact size and then wall elements can be fitted to support those regions which are considered essential. There is no risk of the bearing forces taken by the wall elements causing the latter to be disengaged from the base panel.

Generally, the uninterrupted edges of the wall elements will be fitted in matching channel-like recesses in the base panel. However the invention also includes a wall element construction which is not restricted to the rectilinear and which consists of a plurality of projections for which corresponding recess shapes would be provided.

In many cases the recesses in the base panel will be sufficient to stabilize the wall elements, but in some cases it is desirable to brace and stiffen the wall elements with respect to one another. They are advantageously therefore adapted to be interconnected along their vertical edges. This is preferably effected by special elements which are inserted in the space between the wall elements in co-operation with the vertical edges thereof, a short connection length being sufficient, more particularly at the top edge of the wall elements. These connecting elements may be so constructed as to interconnect not just two wall elements, but a plurality thereof.

The wall elements may be of any desired shape. For example, they may be formed by frames, grids, U-shaped curved parts or the like. Advantageously, however, the surface is constructed without apertures, or else with just a few or just small apertures. The construction of the wall elements in flat form or as a frame enables the top edge as such to carry out the function of the projections co-operating with the recesses in the base panel. In that case the recesses in the base panel are in the form of channels such that the wall elements can be fitted therein by their bottom edge.

According to one advantageous feature of the invention, the wall elements are provided with means for locking them on the base panel, so that they cannot be intentionally withdrawn upwardly by random forces. For this purpose, the recesses in the base panel are advantageously provided with an undercut, while a locking member is provided on the wall element and can be appropriate pivoted to bring it into engagement with the undercut. It is advantageously adapted to be positively secured in the locking position. In some cases it may be sufficient to obtain this effect by a spring force.

According to another feature of the invention the wall elements may be provided or co-operate with supports engaging in separate recesses generally provided a certain distance from the plane of the wall elements in order thus to give lateral stiffening. The connection of adjacent wall elements by connecting elements may be dispensed with, if required, in the case of such stiffening.

The base panel intended for subsequent fitting in the luggage boot is advantageously assembled from a plurality of small elements so that the optimum base panel configuration can be assembled for any particular luggage boot or load area. The individual base elements are advantageously constructed to interlock positively, and according to the invention, to this end, the edges of the base elements are formed with undercut recesses which are situated opposite one another in pairs on adjacent base elements and are adapted to be connected by suitable connecting elements each engaging in a pair of recesses of this kind.

To prevent the base panel from sliding to and fro, its underside is provided with a non-slip covering, e.g. consisting of rough rubber, and in cases in which this is not sufficient, means are advantageously provided for lateral bracing against the walls of the luggage boot, such means being adjustable for adjustment to the specific dimensions.

One exemplified embodiment of the invention is explained in detail hereinafter with reference to the drawing wherein:

FIG. 4 is a vertical cross-section through a wall element with a locking means and FIG. 5 is a vertical cross-section through a wall element with a support.

Figure 1:
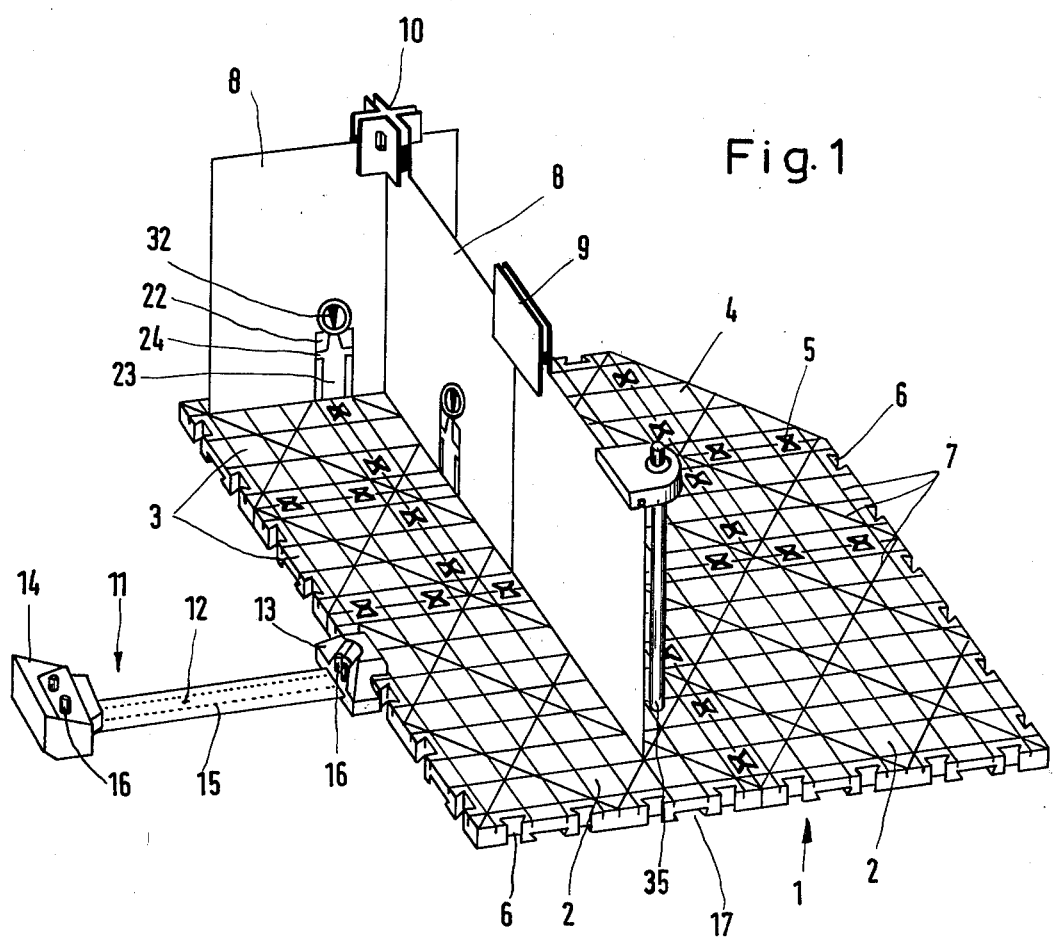
FIG. 1 is a general perspective view.
Figure 2:
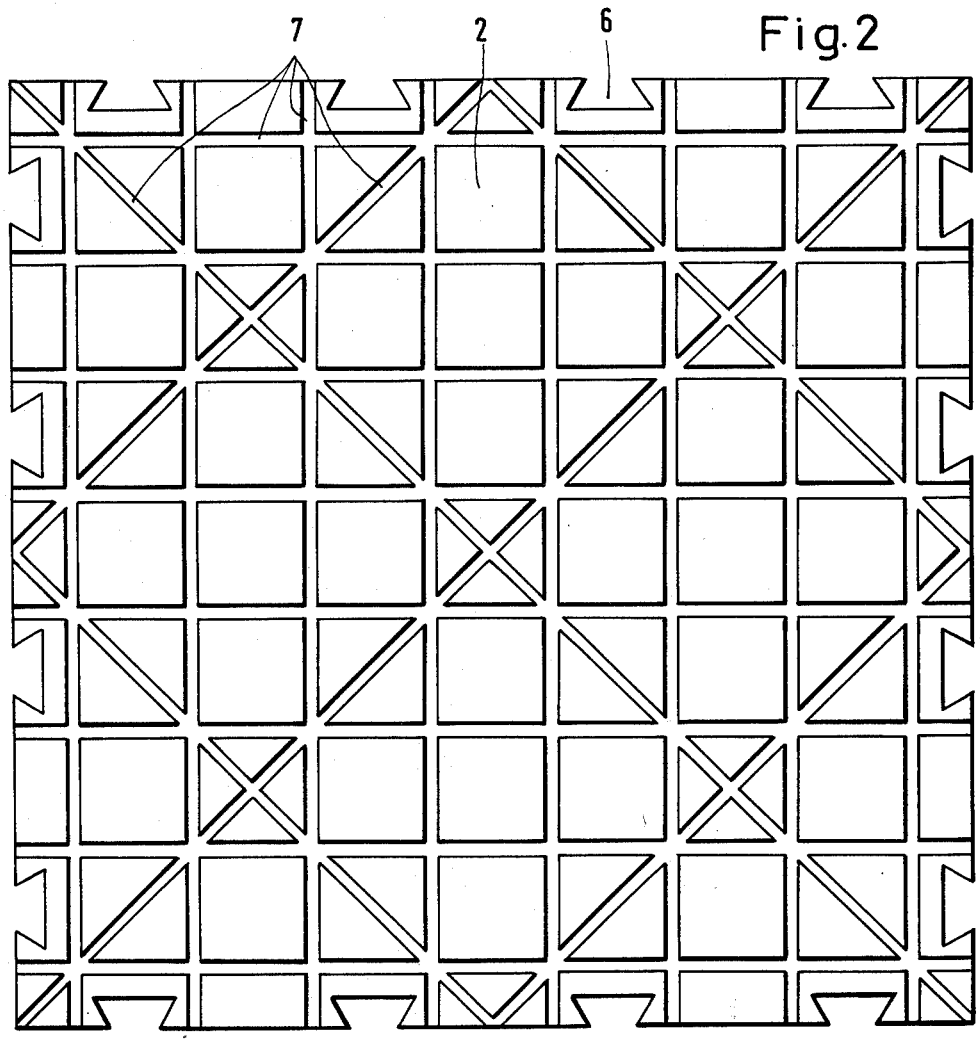
FIGS. 2 and 3 are a plan view and a side view of a base element.
Figure 3:
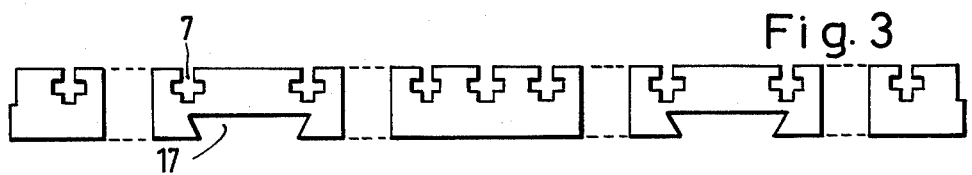

The base plate, board or panel 1 can be fixed in the load compartment or luggage boot. As shown in FIG. 1, it advantageously consists of a plurality of elements, i.e. large square elements 2, small square elements 3 and a triangular element 4, for the subsequent installation. These elements are interconnected by connecting elements 5 engaging in recesses 0 at the edges of the elements, the said recesses being undercut dovetail fashion. The elements 5 are clamped in the recesses under prestressing so that they cannot be unintentionally released.

Grooves 7 extend through the top of the elements and extend partially longitudinally and transversely, and partially diagonally. They are so spaced apart as to allow walls to be fitted therein in practically any desired position.

The bottom edges of the wall elements 8 are fitted into, and retained in, the groove 7. If the top edges of the wall elements 8 are co-planar, they can be interconnected by elements 9. Angular fixing is also possible by means of an element 10 of cruciform shape. The top edges may be provided with projections and recesses corresponding to matching projections and recesses inside the elements 9, the said projections and recesses so co-operating as to prevent any relative displacement in the direction of the wall plane.

In many cases it will be sufficient for the element 9, 10 to have reception grooves on just one side, i.e. the side which will be at the bottom. In the example illustrated, however, they also have grooves at the top so that a second row of walls can be provided above the walls illustrated, the second row being fitted in the said top grooves.

The reception grooves 7 are undercut in cross-section as shown in FIG. 4. This shows the bottom end 20 of a wall element 8 fitted in one of the grooves. Beneath the lateral undercut 21, the groove 7 is of a depth such that the foot 20 is held therein so as to be sufficiently secure against tipping. The wall element 8 has a cut-out 22 (see also FIG. 1), in which a locking element 23 is mounted to pivot about horizontal pivots 24 with respect to the wall plane. The foot of element 23 has a locking projection 25 situated level with the groove undercut 21. When the locking element 23 is pivoted out of the position illustrated, in the direction of arrow 26, the locking projection 25 engages in the undercut 21 in order to hold the wall element fast in the groove 7.

This pivoting movement is obtained by means of a disc 27 mounted rotatably in the wall cut-out 22 above the locking element 23. The disc 27 is of circular contour and the cut-out 22 also has a matching circular contour in this zone, the disc being held therein by means of its collar 28. At the periphery the disc has a helical groove 29 in which the top end 30 of the locking element 23 engages. A recess for manipulation, having a central web 32, is formed at 31 in one flat side of the disc 27 to enable the latter to be turned about its central axis. During this rotation the top end 30 of the locking element 23 is displaced transversely of the wall plane in accordance with the path of the groove 29. In this way the locking projection 25 can be moved into, and held in, the undercut 21 in the groove 7.

FIG. 1 shows another possible way of securing the wall elements in the required position, which is generally not combined with the above-described locking means and which is shown in the same Figure as the latter only to simplify the illustration. This system comprises the support 35, which is shown to a somewhat larger scale in FIG. 5. A plurality of bores 36 having a lug 37 projecting into the bore from one side is suitably distributed over the entire surface of the base plate.

The supports 35 are formed by rods, which have recesses at their bottom end in order to co-operate with the lug 37 after the style of a bayonet fastening, while at the top end they have a manipulator 40. The top end is mounted to be axially non-displaceable in a clamp 38 which has a bottom cut-out 39 to receive the top end of a wall element 8. After the wall elements 8 have been fitted into the grooves 7, which in this case of course need not be undercut, the clamps 38 are fitted and the feet of the rods 35 ae fitted into the associated holes 36 and are turned into the locked position by means of the manipulator provided at the top of the rod. The wall elements 8 are then not only secured against being lifted out but are also stiffened against lateral tipping forces.

The general reference 11 shows means for laterally bracing the base panel, of use for systems subsequently fitted in a luggage boot. Other bracing means of this kind may be provided on other sides of the base panel. The main element of the bracing means is a non-buckling bar 12, on which a cursor 13 is longitudinally slidable and lockable in a number of positions, said cursor engaging after the style of a hook over the edge of the base panel 1 thus protecting it both against lateral displacement and against any possible disengagement from the bar 12. A head 14 is provided at the free end of the bar 12 and is also of hook-shaped construction so that it can hold the base panel instead of the cursor 13 when the edge of the base panel is required to be very close to the end of the bar 12. The head is advantageously detachable so that additional panel elements can subsequently be fitted on to the bar.

The bar 12 is provided with a plurality of recesses for engagement of the cursor 13, said recesses being formed at 15 and being in the form of holes in which at least one pin 16 provided on the cursor 13 and the head 14 can engage. Of course the detent system may be constructed in any other manner.

Grooves to receive the bars 12 of the lateral bracing systems are provided beneath the base panel 1. The outlet cross-section of these grooves can be seen, for example, at 17. These grooves give the bars 12 a lateral hold and, as a result of the dovetail undercutting, vertical support as well.

I claim:

1. A system for holding small articles in a load compartment comprising at least one wall element and a base plate adapted to be laid on the load compartment floor and formed with a plurality of recesses in the form of grooves on the upper surface thereof, into which the edge of said wall element can be fitted vertically, said recesses extending longitudinally, transversely, and diagonally across the upper surface of said base plate, the base plate being provided with recesses for interconnecting with at least one other base plate by means of connecting means.

2. The system according to claim 1 wherein at least two wall elements are used, said wall elements being interconnected in adjacent relationship along the vertical edges thereof.

3. The system according to claim 2 wherein the vertical edges of the wall element are connected by a connecting means.

4. The system according to any one of claims 1 to 3 wherein at least one wall support is provided, said wall support adapted to be connected to said wall element and to engage a recess in said base panel.

5. The system according to any one of claims 1 to 3 wherein said wall element is provided with means for locking said wall element on said base panel.

6. The system according to any one of claims 1 to 3 wherein said recess in said base plate is provided with an undercut, said wall element is provided with a pivotable locking member adapted to engage said undercut in a locked position.

7. The system according to any one of claims 1 to 3 wherein the underside of said base panel is provided with a non-slip covering.

8. The system according to claim 1 wherein longitudinally adjustable means are provided to brace said base panel laterally against the load compartment walls.

* * * * *